(12) United States Patent
Rollins et al.

(10) Patent No.: US 6,519,375 B1
(45) Date of Patent: Feb. 11, 2003

(54) OPTICAL PHASE MODULATOR DESIGN INCORPORATING PRE-EMPHASIS

(75) Inventors: David L. Rollins, Hawthorne, CA (US); Bruce A. Ferguson, Redondo Beach, CA (US)

(73) Assignee: TRW Inc., Redondo Beach, CA (US)

( * ) Notice: Subject to any disclaimer, the term of this patent is extended or adjusted under 35 U.S.C. 154(b) by 38 days.

(21) Appl. No.: 09/620,433

(22) Filed: Jul. 20, 2000

(51) Int. Cl.[7] ................................................ G02F 1/035
(52) U.S. Cl. ....................... 385/2; 385/3; 385/8; 385/40
(58) Field of Search ................................ 385/1–3, 4, 5, 385/8, 9, 27, 39, 40

(56) References Cited

U.S. PATENT DOCUMENTS

| | | | |
|---|---|---|---|
| 5,402,259 A | 3/1995 | Lembo et al. | ............... 359/245 |
| 6,243,505 B1 * | 6/2001 | Bosso et al. | .................... 385/2 |
| 6,301,399 B1 * | 10/2001 | Mahapatra et al. | ............. 385/2 |

OTHER PUBLICATIONS

Yabre, G., "Analog Direct–Modulation Behavior of Semiconductor Laser Transmitters Using Optical FM Demodulation," Mar. 1998, pp. 411–418, Journal of Lightwave Technology, vol. 16, No. 3.

Ackerman, E., "Linearization of a Broadband Analog Optical Link Using Multiple Wavelengths," pp. 45–48, 1998 IEEE, Int'l. Topical Meeting on Microwave Photonics, Oct. 12–14, 1998.

Kaneko, S., "An Electroabsortption Modulator Module for Digital and Analog Applications," Apr. 1999, pp. 669–676, Journal of Lightwave Technology, vol. 17, No. 4.

* cited by examiner

Primary Examiner—Rodney Bovernick
Assistant Examiner—Juliana K. Kang
(74) Attorney, Agent, or Firm—Harness, Dickey & Pierce, P.L.C.

(57) ABSTRACT

An optical modulator (20) that operates as a phase modulator at high frequency and as a frequency modulator at low frequencies to provide a suitable signal-to-noise ratio over a wide frequency band. The modulator (20) includes an optical waveguide 120 and opposing RF electrodes (122, 124) formed in the waveguide (120). An RF input signal is applied to the electrodes (122, 124) to create an electric field that changes the index of refraction of the waveguide (120) to affect the propagation speed of an optical carrier signal (126), and thus provide the modulation. The electrodes (122, 124) are long velocity-matched electrodes that provide the RF loss versus RF frequency needed to produce the desired $V\pi$ versus RF frequency over the entire bandwidth. The lower $V\pi$ at lower RF frequencies will emphasize the lower frequencies and improve the low-frequency fidelity of the optical link by boosting the low-frequency signals above the excess link noise generated in the demodulator (12).

11 Claims, 6 Drawing Sheets

OPTICAL PHASE MODULATOR DESIGN INCORPORATING PRE-EMPHASIS

STATEMENT REGARDING FEDERALLY SPONSORED RESEARCH OR DEVELOPMENT

The U. S. Government has certain rights in this invention pursuant to FAR 52.227-12.

BACKGROUND OF THE INVENTION

1. Field of the Invention

This invention relates generally to an optical modulator for an analog optical link and, more particularly, to an optical phase modulator for an analog optical link that includes long velocity-matched electrodes having pre-emphasis to provide an RF loss versus RF frequency needed to produce the desired $V\pi$ versus RF frequency over a wide bandwidth.

2. Discussion of the Related Art

Analog optical links are used in various optical communications systems where the transmission of large bandwidth signals are required, without the need for analog-to-digital (A/D) converters or digital-to-analog (D/A) converters. Digitization of analog RF signals is an excellent way of enabling information transfer, and the capability of digital optical links to convey such information is well known. However, digitizing an analog RF signal having a 5 GHz bandwidth requires approximately a 100 Gbps digital link throughput, which is well beyond current data link capabilities. Therefore, analog links are required to meet the desired wideband transmission requirements.

Analog optical links transmit RF signals modulated onto an optical carrier signal. The optical carrier signal generally is transmitted along a fiber optic cable or through free space to a receiver where it is demodulated to recover the RF data. The optical link allows the RF data to be transmitted with low losses and at high bandwidths, and thus is attractive in many communications systems to provide the desired performance, especially high frequency RF communications systems that transmit signals in the GHz bandwidth range. Also, telescopes used to transmit optical signals in free space have a much greater directivity than RF antennas of comparable size.

The analog optical links being discussed herein need to be wideband analog signals having high-fidelity. A wideband signal discussed herein may be up to tens of GHz. By high fidelity, it is meant transmission of signal information with resultant dynamic range and a signal-to-noise (SNR) equivalent to that achievable if the signal were digitized with more than six bits and transmitted using a digital communication link. To have the desired performance for various communications systems, the optical link must provide a good dynamic range, i.e., allow the simultaneous transmission of signals having widely varying amplitudes that do not interfere with each other, with minimal optical power requirements.

Currently, intensity modulation (IM) is the dominant optical modulation choice for analog optical links. In IM, the intensity of the optical light is modulated with the RF signal. Unfortunately, IM does not provide high enough performance because significant transmission power is required to provide the desirable dynamic range and signal-to-noise ratio (SNR) for a particular application. In fact, ideal linear IM requires 9 dB more received optical power than ideal suppressed carrier amplitude modulation (AM) to get the same demodulated SNR. To overcome this problem, known intensity modulation optical links provide a series of optical amplifiers to boost the optical carrier signal power as it propagates along an optical fiber. The number of optical amplifiers needed can be costly. Also this technique cannot be used for long distance free space links.

Wideband frequency modulated (FM) or phase modulated (PM) optical links can theoretically use the extremely wide bandwidth available at optical frequencies to achieve much better dynamic range and SNR than IM optical links for the same received power. For example, phase modulation having a peak phase deviation of 10 radians has a 26 dB greater link SNR potential compared to ideal IM, and a 17 dB greater SNR potential than suppressed-carrier AM.

Known FM or PM communications systems must significantly modulate the carrier frequency or phase to achieve better dynamic range and SNR performance than AM. In other words, the frequency deviation or phase deviation of the carrier signal which is induced by the RF input signal must be large enough to increase the bandwidth of the modulated carrier substantially beyond that of an AM modulated carrier.

Phase modulated optical links generate an additive noise floor that is higher at lower frequencies. Therefore, the sensitivity of multi-octave frequency ranges is degraded at the lower frequencies. Also, since optical frequency demodulators are generally used to demodulate a phase modulated signal, an RF integrator is needed to recover the signal. Multi-octave RF integrators generally have a large gain slope across the signal frequency range and can be difficult to implement.

Frequency modulated optical links do not have the low frequency noise problem that phase modulated optical links have. However, direct wideband frequency modulation of an optical beam is much more difficult and less desirable than external phase modulation. Direct frequency modulation of the carrier wave laser source requires the laser beam to be co-located with the RF input signal so that no photonic remoting of the laser beam is allowed. Direct frequency modulation can also interfere with line width reduction circuitry, which is important to maintain the low overall FM or PM link noise floor. External frequency modulation using an RF integrator followed by an external phase modulator has the same gain slope and implementation problems associated with the phase demodulator.

What is needed is an optical modulator for a wideband, high fidelity optical link that acts like a phase modulator at high frequencies and a frequency modulator at low frequencies. It is therefore an object of the present invention to provide such an optical modulator.

SUMMARY OF THE INVENTION

In accordance with the teachings of the present invention, an optical modulator for an optical link is disclosed that operates as a phase modulator at high frequencies and as a frequency modulator at low frequencies to provide a suitable signal-to-noise ratio over a wide frequency band. The modulator includes an optical waveguide and opposing RF electrodes formed in the waveguide. An RF input signal is applied to the electrodes to create an electric field that changes the index of refraction of the waveguide to affect the propagation speed of an optical carrier signal, and thus provide the modulation.

The electrodes are long velocity-matched electrodes that provide the RF loss versus RF frequency needed to produce the desired $V\pi$ versus RF frequency over the entire bandwidth. The lower $V\pi$ at lower RF frequencies will emphasize the lower frequencies and improve the low-frequency fidelity of the optical link by boosting the low-frequency signals above the excess link noise generated in the demodulator. If the electrode losses are proportional to the RF frequency and the waveguide is long enough, then the magnitude response of the link is like a frequency modulated link. If the electrode losses are proportional to the square root of the RF frequency and the waveguide is long enough, than the magnitude response of the link is between frequency modulation and phase modulation. At higher frequencies, the modulator operates as a true phase modulator.

Additional objects, features and advantages of the present invention will become apparent from the following description and appended claims taken in conjunction with the accompanying drawings.

DETAILED DESCRIPTION OF THE PREFERRED EMBODIMENTS

The following discussion of the preferred embodiments directed to a pre-emphasis phase modulator for an analog optical link is merely exemplary in nature, and is in no way intended to limit the invention or its applications or uses.

Figure 1:
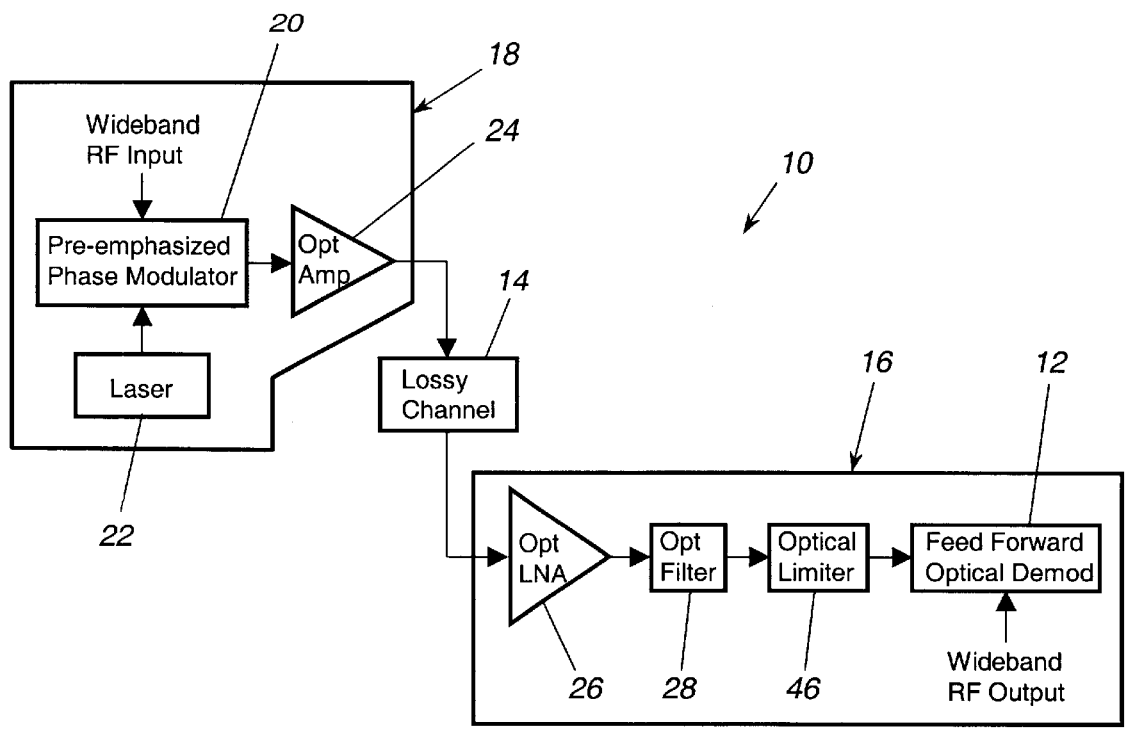
FIG. 1 is a schematic block diagram of wide-band, high-fidelity analog optical link, according to an embodiment of the present invention.

FIG. 1 is a schematic block diagram of a communications system 10, including a transmitter 18 and a receiver 16, according to an embodiment of the present invention. According to the invention, an RF signal s(t) to be transmitted is a wideband high-fidelity analog signal. For the discussion herein, wideband is greater than 1 GHz, and particularly greater than 4 GHz. Further, high-fidelity is defined as a signal having the resultant dynamic range and SNR equivalent to that achievable if the signal were digitized with more than 6 bits and transmitted using a digital communication link.

The RF input signal s(t) to be transmitted on a lossy analog optical channel 14 is applied to an optical modulator 20 within the transmitter 18. The channel 14 can be either free space or a fiber optic cable. The optical modulator 20 can be either a phase modulator or a frequency modulator within the scope of the present invention, as will be discussed below. An optical carrier signal from a laser source 22 is also applied to the modulator 20. In one design, the RF signal s(t) generates an electric field across an optical waveguide in the modulator 20 through which the carrier signal is propagating. Changes in the electric field cause the index of refraction of the waveguide in the modulator 20 to change. This causes the carrier signal to speed up or slow down in association with changes in the RF signal, thus modulating the carrier signal. This is one example of modulation of an RF signal known in the art. Other modulation schemes that provide phase modulation or frequency modulation can also be employed within the scope of the present invention. The modulated carrier signal is amplified by an optical amplifier 24 and then transmitted on the lossy optical channel 14.

The optical signal on the channel 14 is applied to an optical low-noise amplifier (LNA) 26 in the receiver 16. The amplified optical signal is then bandpass filtered by an optical filter 26 that removes some of the noise generated by the optical amplifiers 24 and 26 and the lossy channel 14. An optical limiter 46 receives the amplified and filtered optical signal, and acts to suppress amplitude noise from the optical amplifiers 24 and 26, the laser source 22 and any time-varying link losses. The optical signal is then applied to a feed-forward optical demodulation system 12 that demodulates the optical signal to remove the RF signal. Various embodiments of the optical demodulation system 12 will be discussed below.

Figure 2:
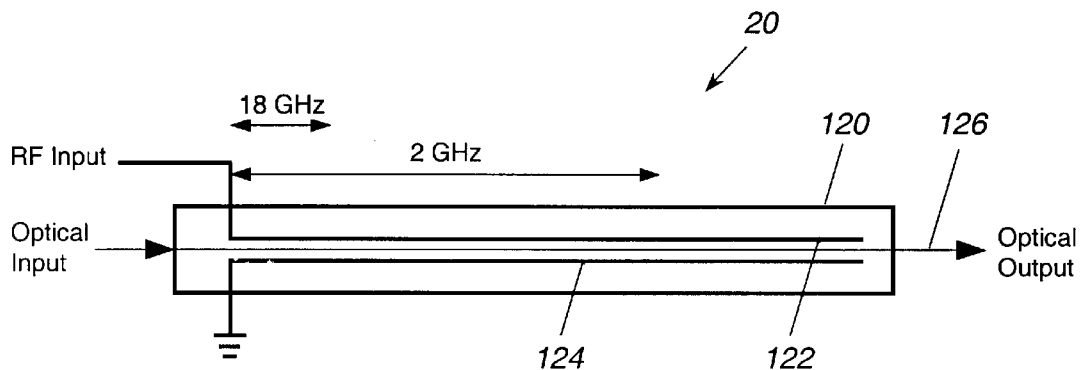
FIG. 2 is a plan view of an optical phase modulator used in the transmitter of the optical link shown in FIG. 1.

According to one embodiment of the present invention, the modulator 20 is a phase modulator designed to operate at a wideband frequency range without significant noise degradation at lower frequencies. FIG. 2 is a plan view of the phase modulator 20 removed from the transmitter 18. The phase modulator 20 includes a semiconductor optical waveguide 120 and opposing RF electrodes 122 and 124 formed within the waveguide 120, as shown. In one embodiment, the optical waveguide 120 is a lithium niobate material, but can be any suitable optical waveguide material or architecture known in the art. The RF input signal is applied to the electrode 122 that creates an electric field across the waveguide 120. The electric field in the waveguide 120 changes the index of refraction of the waveguide 120, that affects the propagation speed of an optical carrier signal 126 from the laser 22 propagating down the waveguide 120. Therefore, the carrier signal 126 is modulated by the RF input signal.

According to the invention, the electrodes 122 and 124 are relatively long velocity-matched electrodes that provide the RF loss versus RF frequency needed to produce the desired Vπ versus RF frequency over the entire wide bandwidth. Vπ identifies the amount of voltage applied to the electrodes 122 and 124 that causes a phase shift in the optical carrier signal 126 of π radians. Phase modulators with lower Vπ at lower frequencies will emphasize the lower frequencies and improve the low-frequency fidelity of multi-octave optical links. The frequency of the RF input signal s(t) determines whether the modulator 20 is a phase modulator or a frequency modulator. The difference in the losses encountered by the RF signal at different frequencies causes the modulator 20 to act like a frequency modulator at lower frequencies. In other words, the losses in the modulator 20 mimic the effects of an integrator that causes the phase modulator 20 to act like a frequency modulator at low frequencies. The operation of the modulator 20 in this manner provides a pre-emphasis at the lower frequencies.

Figure 3:
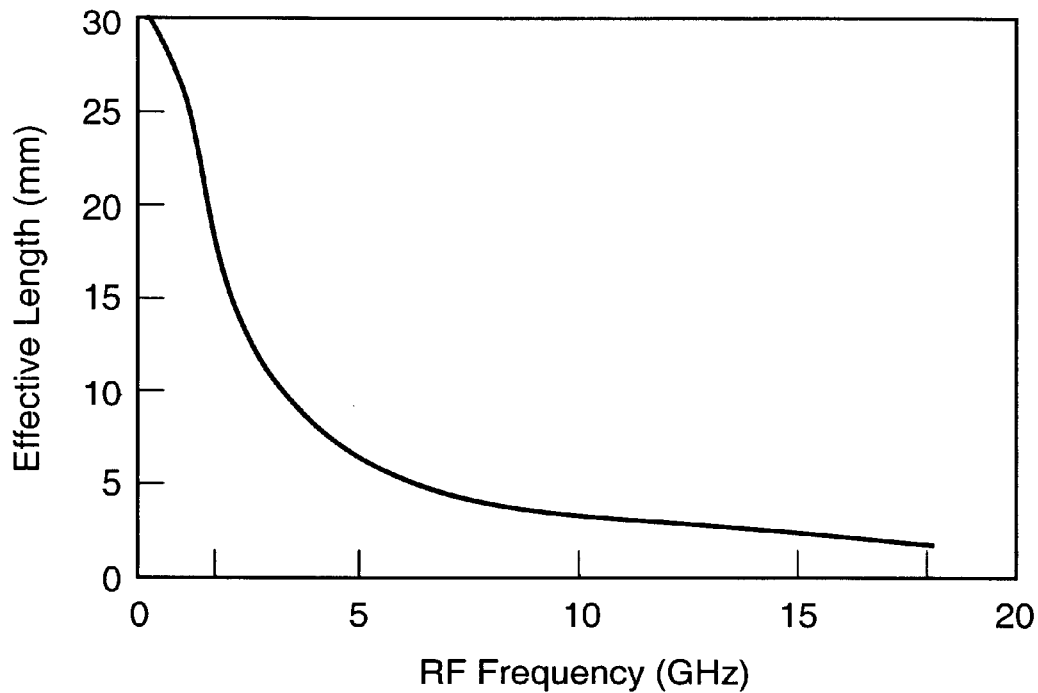
FIG. 3 is a graph with effective electrode length on the vertical axis and RF frequency on the horizontal axis depicting the performance of the optical phase modulator shown on FIG. 2.
Figure 4:
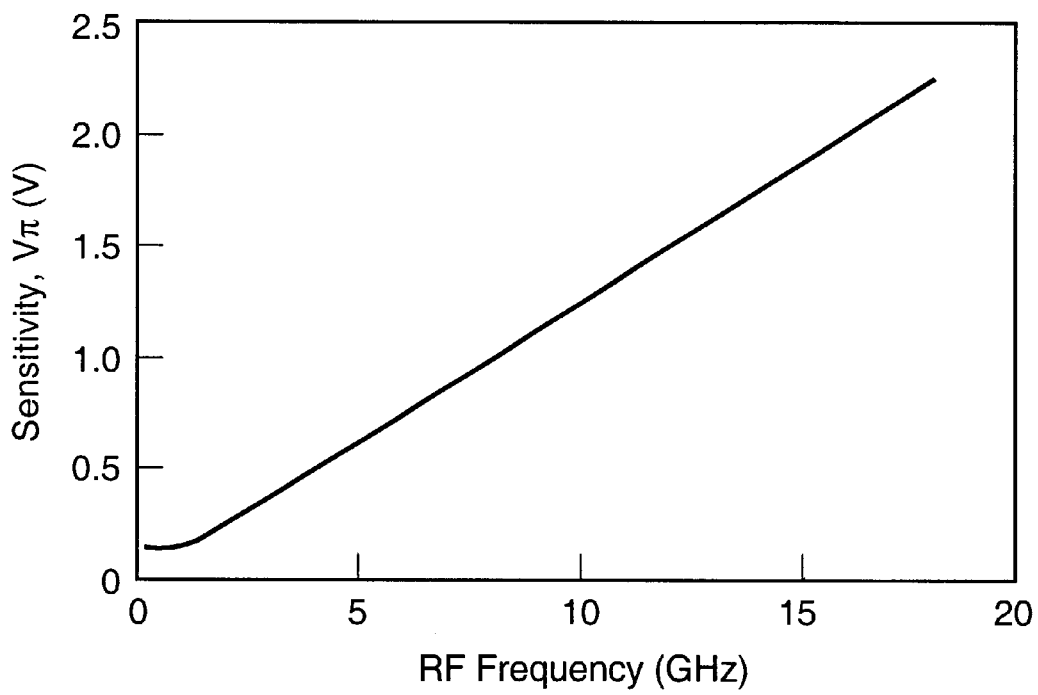
FIG. 4 is a graph with sensitivity on the vertical axis and RF frequency on the horizontal axis depicting the performance of the optical phase modulator shown in FIG. 2.

The RF losses in velocity-matched phase modulators generally increase with RF frequency. These RF losses are small dB per unit length of electrode and are generally proportional to $f^x$, where $\frac{1}{2}<x<1$. This implies that the lower RF frequencies will have longer effective interaction lengths if the phase modulator 20 is made long enough. Longer interaction lengths give the RF signal more time to modulate the optical carrier signal 126, and thus give lower $V\pi$. The lower $V\pi$ at the lower end of the frequency range boosts low frequency signals above the excess link noise generated in the demodulation system 12. FIG. 3 is a graph with effective electrode length on the vertical axis and RF frequency on the horizontal axis, and FIG. 4 is a graph with sensitivity ($V\pi$) on the vertical axis and RF frequency on the horizontal axis that shows this relationship.

Normally, phase modulators are not made long enough to see much of this $V\pi$ frequency dependency. These modulators are typically designed by reducing the $V\pi$ at the upper end of the frequency range and generally providing $V\pi$ roughly independent of frequency. Therefore, the known phase modulators are not made any longer than necessary, until the electrode losses exceed roughly 6 dB at the highest frequency.

As discussed herein, by making the electrodes 122 and 124 longer than the corresponding electrodes of the known phase modulators of this type, the modulator 20 operates as a hybrid phase and frequency modulator. This is because the RF losses in the electrodes 122 and 124 are different at different RF frequencies, and thus the amount of modulation is different for the different RF frequencies. In the known modulators of this type, the electrodes were typically made short so that the modulation of the carrier signal was substantially linear over the entire operational bandwidth of the modulator. In other words, the known modulators were designed so that the same amount of phase modulation occurred for all of the frequencies over the operational range. In contrast, the modulator 20 of the present invention, operates over a much wider frequency band, and takes advantage of the RF losses in the electrodes 122 and 124 to provide the desired performance. In other words, the fact that the modulation is different for different RF frequencies improves the fidelity of the system 10 over the entire wide bandwidth.

In one embodiment, a relatively long electrode has 18 dB of electrical loss at 18 GHz and 6 dB of electrical loss at 2 GHz. So, the effective electrode length at 2 GHz is approximately three times as long as the effective electrode length at 18 GHz. Thus, the phase modulation depth (phase shift of the optical carrier) is approximately three times as much for a signal at 2 GHz as a signal at 18 GHz with the same power level. At the phase demodulator output, a signal at 2 GHz will be 20 log(3) or 9.54 dB higher than a signal at 18 GHz with the same input power level. Thus, even if the link-generated output noise floor is 9 dB higher at 2 GHz compared to the 18 GHz, the length will not degrade the SNR of the signal at 2 GHz anymore than the signal at 18 GHz. Thus, the design of the phase modulator 20 accommodates a bandwidth between 2–18 GHz for the same SNR.

The RF electrodes 122 and 124 and the length of the waveguide 120 can be designed to achieve the pre-emphasis desired for the particular frequency range and sensitivity requirements. Since optical phase demodulation will most likely use a frequency demodulator, this low frequency pre-emphasis in the phase modulator 20 will reduce or eliminate the need for further equalization to provide a flat link RF gain across the frequency range. Thus, in the demodulator system 12, the RF integrator is replaced with a simple passive 90° hybrid and possibly an equalizer.

This pre-emphasis makes a PM optical link look more like an FM optical link. If the electrode losses in dB are proportional to the RF frequency and the waveguide 120 is long enough, then the magnitude response of the link is just like an FM link. If the electrode losses in dB are proportional to the square root of the RF frequency and the waveguide 120 is long enough, then the magnitude response of the link is mid-way between FM and PM.

Figure 5:
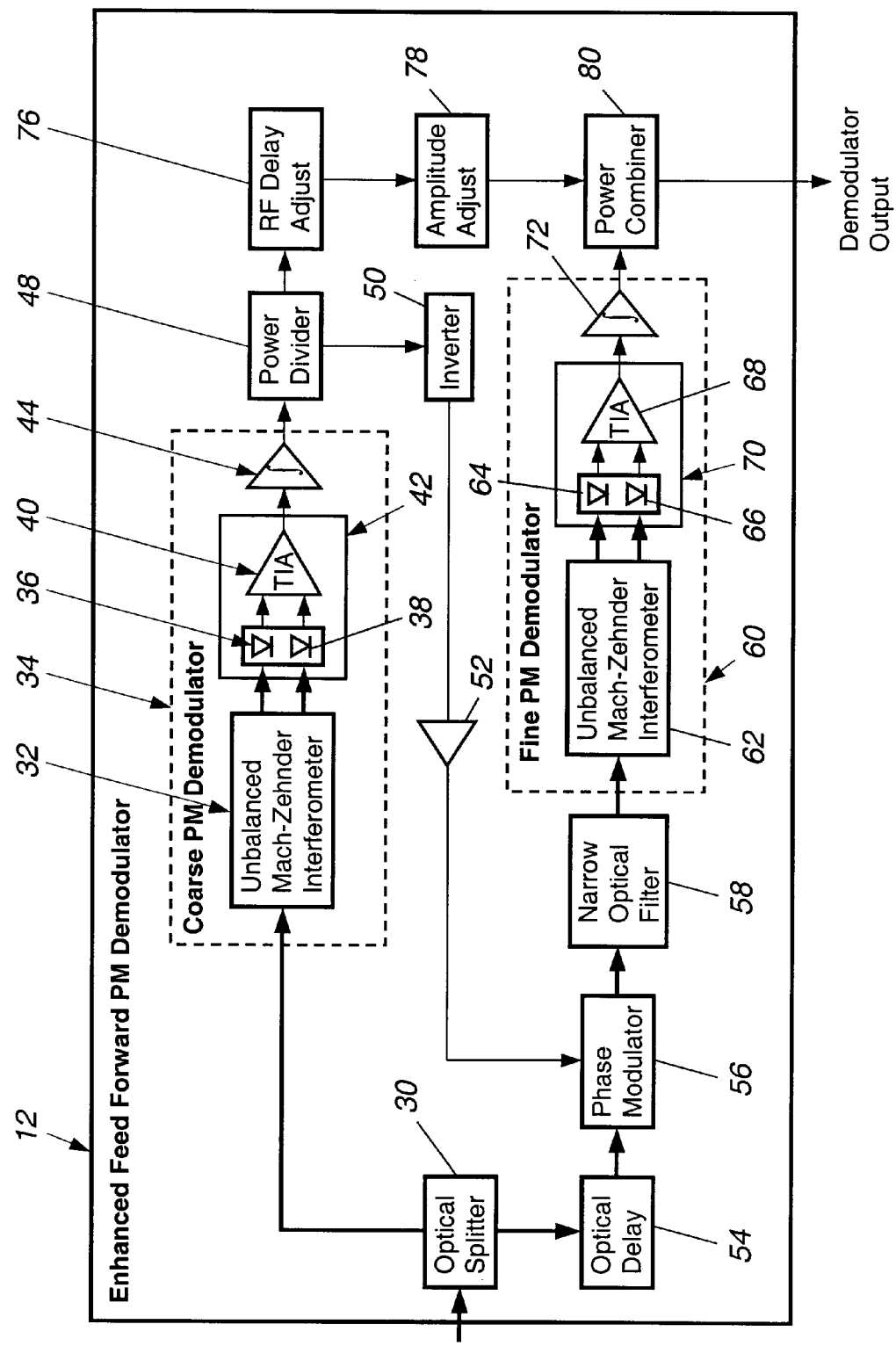
FIG. 5 is a schematic block diagram of a feed-forward optical PM demodulator used in the receiver of the optical link shown in FIG. 1, according to an embodiment of the present invention.

FIG. 5 is a schematic block diagram of the demodulation system 12, according to an embodiment of the present invention. In this example, the demodulation system 12 is a feed-forward optical PM demodulation system. The filtered optical signal from the limiter 46 is applied to an optical splitter 30 within the demodulation system 12 that provides two split optical signals that are copies of the modulated optical carrier signal. The splitter 30 does not have to be a 50/50 splitter, but can be any relative power splitter suitable for a particular application, as would be understood to those skilled in the art.

One of the signals from the splitter 30 is applied to an unbalanced optical MZI 32 within a coarse PM demodulator 34. As is known in the art, an unbalanced optical MZI separates an input optical signal into two optical paths, where the two path lengths are different so one signal is delayed relative to the other signal. The two signals are then combined in a directional coupler in the MZI 32 to produce two output signals. The MZI 32 translates frequency modulation into intensity modulation. And the two outputs are complementary of each other. In other words as the frequency of the optical carrier increases the intensity of one output goes up while the intensity of the other output goes down. The relative delay is a design parameter, but it should be set to a quadrature bias point. The MZI is quadrature biased when the relative delay is a multiple of the period of the unmodulated optical carrier offset by a quarter of its period. When the MZI is quadrature biased, the two outputs are most linear and have a common nominal intensity. The operation of an unbalanced Mach-Zehnder interferometer incorporating a directional coupler is well known to those skilled in the art.

One of the outputs from the MZI 32 is applied to a first photodetector 36 and the other output from the MZI 32 is applied to a second photodetector 38 that demodulate the optical signals to generate representative electrical signals. The two electrical signals are then applied as inputs to a differential amplifier 40. The differential amplifier 40 amplifies the difference between the two complementary RF signals, and cancels or nulls the bias as well as all common mode noise and distortion. The combination of the photodetectors 36 and 38 and the differential amplifier 40 make up a balanced photoreceiver 42. The balanced photoreceiver 42 strips away the optical carrier from the optical signal, and provides a frequency demodulated signal at the output of the differential amplifier 40. The output of the differential amplifier 40 is then applied to an RF integrator 44 to provide the PM demodulation. Using an unbalanced MZI and photoreceiver as discussed herein is a known technique for providing frequency demodulation.

The RF output from the coarse demodulator 34 is a coarse representation of he RF signal s(t), and is defined here as $A[s(t)-\epsilon(t)]$. In this equation, A is the amplitude scale factor between the RF signal s(t) and the coarse demodulator output, and the error signal $\epsilon(t)$ represents the error in the coarse demodulator output consisting of noise and signal distortion caused by the demodulation process. The PM theoretical minimum noise is from amplified spontaneous emissions (ASE) noise from the optical amplifiers 24 and 26 beating against an unmodulated optical carrier signal (carrier×ASE noise). In a properly designed link, other noise sources such as shot noise from photodetectors 36 and 38, thermal noise from the differential amplifier 40, phase and relative intensity noise (RIN) from the laser source 22, and ASE×ASE noise are small compared to the carrier×ASE noise.

For small phase deviations, the noise generated in the coarse demodulator 34 is near the theoretical PM value. But as the phase deviations in the carrier signal approach or exceed $\pi$ radians, the noise generated in the coarse demodulator 34 rises substantially above the theoretical value and the third-order distortion can also become significant. Thus the error $\epsilon(t)$ in the coarse demodulator output becomes relatively large. In other words, when the phase modulator 20 modulates the carrier signal with the RF signal in such a way as to produce large phase deviations, the performance of the coarse demodulator 34 degrades. Recall that in order to provide substantially improved dynamic range and SNR performance compared to IM links, PM links must have large phase deviations. Therefore, the demodulator 34 alone cannot provide increased performance beyond the traditional IM format. Additionally, the demodulator 34 has poor linearity, similar to the known IM links that use a quadrature-bias Mach-Zehnder interferometer in the transmitter end for modulation and a photodetector in the receiver end for demodulation. Therefore, the linearity of the demodulator 34 is also not a significant improvement over the state of the art. More signal processing is thus required to provide the desired performance.

The signal from the demodulator 34 is applied to an RF power divider 48 that splits the signal into two copies of itself. One of the signals is applied to an inverter 50 that inverts the signal to be $-A[s(t)-\epsilon(t)]$. This signal is applied to an RF amplifier 52 that amplifies the inverted signal back to a level near that of the RF signal at the input to the phase modulator 20 in the transmitter 18. Thus the output of the RF amplifier 52 is $-[s(t)-\epsilon(t)]$. In an alternate embodiment, the power divider 48 and the inverter 50 can be combined as a single 180° hybrid that provides an inverted and a non-inverted copy of an input signal. Other components can also be used to provide a split signal and an inverted signal from the coarse demodulator 34, as would be appreciated by those skilled in the art. Additionally, the amplifier 52 can be positioned at other locations in the demodulation system 12 other than after the inverter 50, as would also be appreciated by those skilled in the art.

The other split signal from the splitter 30 is applied to an optical delay device 54 that delays the signal a period of time relative to the propagation time of the demodulator 34 and other components. The delay device 54 provides a timing alignment between the split optical signal and the signal from the amplifier 52. The delayed optical signal with phase modulation $s(t)$ from the delay device 54 and the signal $-[s(t)-\epsilon(t)]$ from the amplifier 52 are aligned with each other in time. The phase modulator 56 operates in the same manner as the phase modulator 20, where the optical signal with phase modulation $s(t)$ is modulated by the RF signal $-[s(t)-\epsilon(t)]$ to get an optical signal with phase modulation $\epsilon(t)$. In other words, the modulated carrier signal from the delay device 54 is again modulated in the phase modulator 56 by an RF signal that includes $-s(t)$. Therefore, the signals $s(t)$ and $-s(t)$ cancel, leaving an optical carrier signal that is phase modulated with $\epsilon(t)$, i.e., the additive inverse of the noise and distortion in the signal from the demodulator 34.

The purpose of the phase modulator 56 is to "null" or suppress the original modulation of the optical carrier using the output of the coarse demodulator 34 as an estimate of the original modulation. This "nulling" effectively reduces the phase modulation from wideband to narrow band, which drastically reduces the modulation bandwidth. The resulting optical signal can then be filtered to a much narrower bandwidth than the received transmission bandwidth affecting the residual modulation on the optical carrier.

The optical carrier signal from the phase modulator 56 is then applied to a narrow band optical filter 58. The purpose of the narrowband optical filter 58, is to reduce the bandwidth of the optical noise, thereby reducing the optical noise power and increasing the optical carrier-to-noise ratio (CNR) at the input to the fine PM demodulator 60.

The filtered optical carrier signal from the filter 58 is applied to a fine PM demodulator 60 that demodulates this signal in the same manner as the demodulator 34. Particularly, the demodulator 60 includes an unbalanced MZI 62 that generates complementary output signals that are applied to photodetectors 64 and 66 to demodulate the signals. The electrical complementary signals from the photodetectors 64 and 66 are applied to a differential amplifier 68 that generates a difference output signal that removes the bias as well as all common mode noise and distortion. The combination of the photodetectors 64 and 66 and the amplifier 68 make up a balanced photoreceiver 70. This signal is then applied to an RF integrator 72 to generate the phase demodulated RF error signal $\epsilon(t)$. Although the error signal $\epsilon(t)$ is large compared to the noise level of an ideal demodulator, it is small compared to the signal $s(t)$ in a properly design link above threshold. Thus the phase deviations in the carrier signal at the input to the fine demodulator 60 are small, and therefore the noise generated in the fine demodulator 60 is near the theoretical PM value. The small phase deviations also allow the fine demodulator 60 to demodulate the error signal $\epsilon(t)$ with very little distortion.

The signal $A[s(t)-\epsilon(t)]$ from the power divider 48 is applied to an RF delay device 76 to align it in time with the signal from the fine demodulator 60. The signal from the RF delay device 76 is applied to an amplitude adjust device 78 to remove the scale factor A to generate the signal $s(t)-\epsilon(t)$. This signal is applied to a power combiner 80 along with the error signal $\epsilon(t)$ from the demodulator 60, that when combined provides a demodulated output of the RF signal $s(t)$ with very little distortion and an additive noise level near the theoretical PM value. Therefore, the operation of the demodulator 12 provides a substantially clean copy of the RF input signal applied to the transmitter 18.

The filter 58 allows the fine demodulator 60 to have a much higher input optical CNR, and thus, will introduce much less excess noise due to optical noise beating against itself (noise×noise). The coarse demodulator 34 will still produce excess noise from optical noise×noise but it will be suppressed by the feed forward noise cancellation through the two paths from the coarse modulator output to the full feed forward output. Thus, the filter 58 effectively lowers the demodulators threshold CNR. For phase modulation, the noise floor reduction is greatest at the low end of a multi-octave frequency range.

Figure 6:
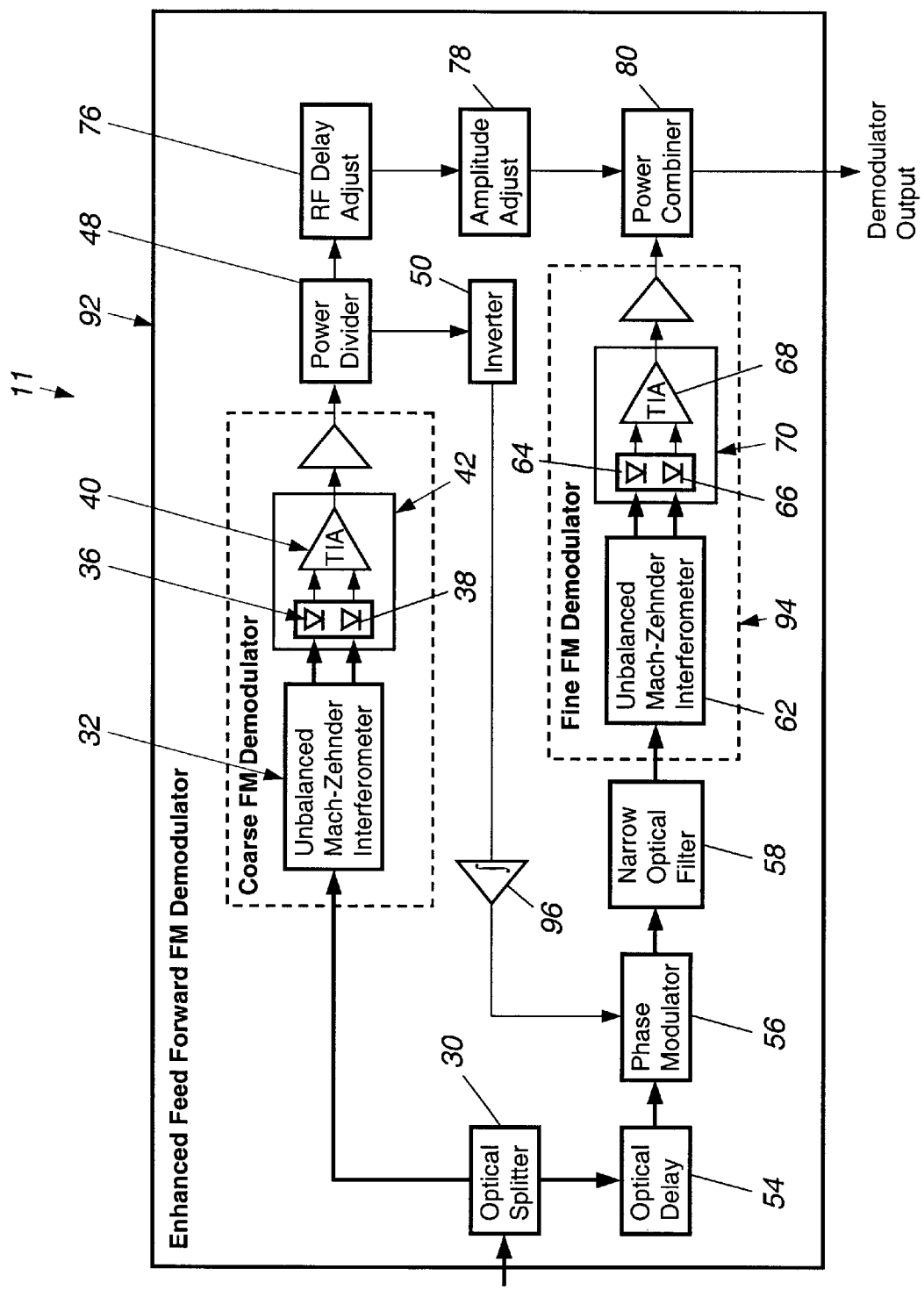
FIG. 6 is a schematic block diagram of a feed-forward optical FM demodulator that can be used in the receiver of the optical link shown in FIG. 1, according to another embodiment of the present invention.

The same demodulation process as discussed above for the communications system 10 can be used for those systems that provide frequency modulation, as opposed to phase modulation, of the RF input signal onto the optical carrier wave 126. FIG. 6 is a schematic block diagram of a communications system 11, including a feed-forward optical FM demodulation system 90 depicting this variation. The transmitter portion and the optical link portion of the communications system 10 are not shown in this embodiment. The transmitter 18 would include any suitable frequency modulation device to frequency modulate the optical carrier signal from the laser source 22 with the RF input signal s(t). In one embodiment, an integrator is employed in combination with the phase modulator 20 to provide frequency modulation, as is well understood in the art.

The frequency modulated optical carrier signal is applied to the optical splitter 30 in the demodulation system 90 in the same manner as discussed above. The same reference numerals in the demodulation system 90 represent the same components as in the demodulation system 12, and operate in the same manner. In this embodiment, the coarse PM demodulator 34 is replaced with a coarse FM demodulator 92, and the fine PM demodulator 60 is replaced with a fine FM demodulator 94. The demodulators 34 and 60 become frequency demodulators by removing the RF integrators 44 and 72, as shown. Additionally, the amplifier 52 is replaced with an RF integrator 96 so that the RF signal from the inverter 50 is frequency modulated by the combination of the integrator 96 and the phase modulator 56. The resulting cancellation of the error signal is accomplished in the same manner as discussed above.

Figure 7:
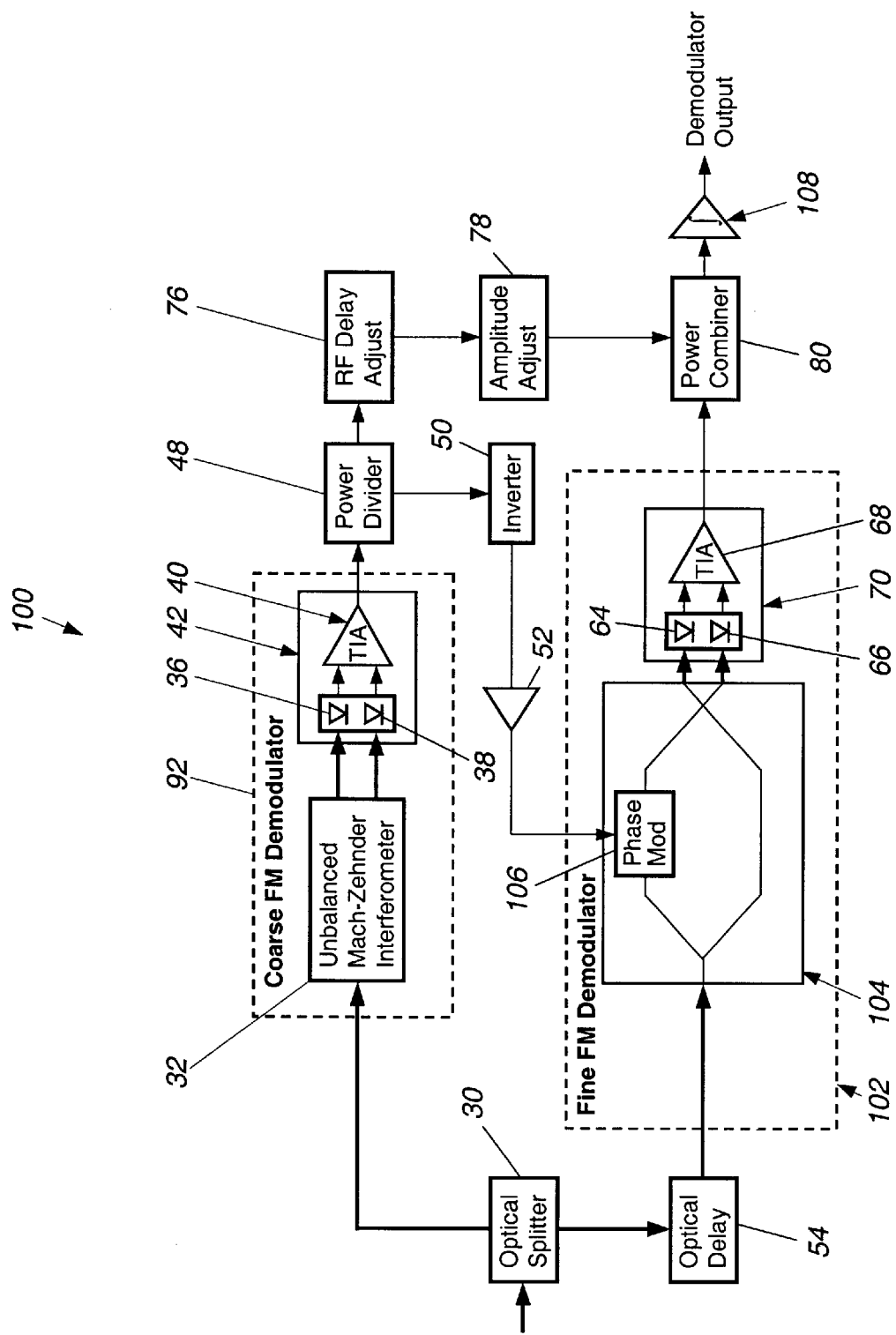
FIG. 7 is a schematic block diagram of a feed-forward optical PM demodulator, including an embedded phase modulator, that can be used in the receiver of the optical link shown in FIG. 1, according to another embodiment of the present invention.

FIG. 7 is a schematic block diagram of another feed-forward optical PM demodulation system 100 that is an alternative embodiment to the PM demodulation system 12, discussed above. The demodulation system 100 uses the coarse FM demodulator 92 and a fine FM demodulator 102 instead of the coarse and fine PM demodulators 34 and 60 because the demodulators 92 and 102 do not include the RF integrators 44 and 72 in this design. Additionally, the phase modulator 56 has been removed, and replaced with a phase modulator 106 positioned within an optical path of an unbalanced MZI 104 in the fine demodulator 102. By positioning the phase modulator 106 in the MZI 104 instead of before the fine demodulator 102, the modulation on the optical carrier signal can be cancelled in the fine demodulator 102 without the need for an RF integrator 44 or 96 preceding the phase modulator 106. The modulation is not cancelled directly. Instead the MZI bias is rapidly adjusted to null the modulation in the frequency-to-intensity conversion that occurs in the directional coupler at the output of the MZI 104. This rapid bias adjustment keeps the MZI very near quadrature all the time, which allows the fine demodulator 102 to demodulate the error signal e(t) with very little added noise and distortion as in the other embodiments discussed above. In this embodiment, an RF integrator 108 receives an output from the power combiner 80 to provide the phase demodulation.

Figure 8:
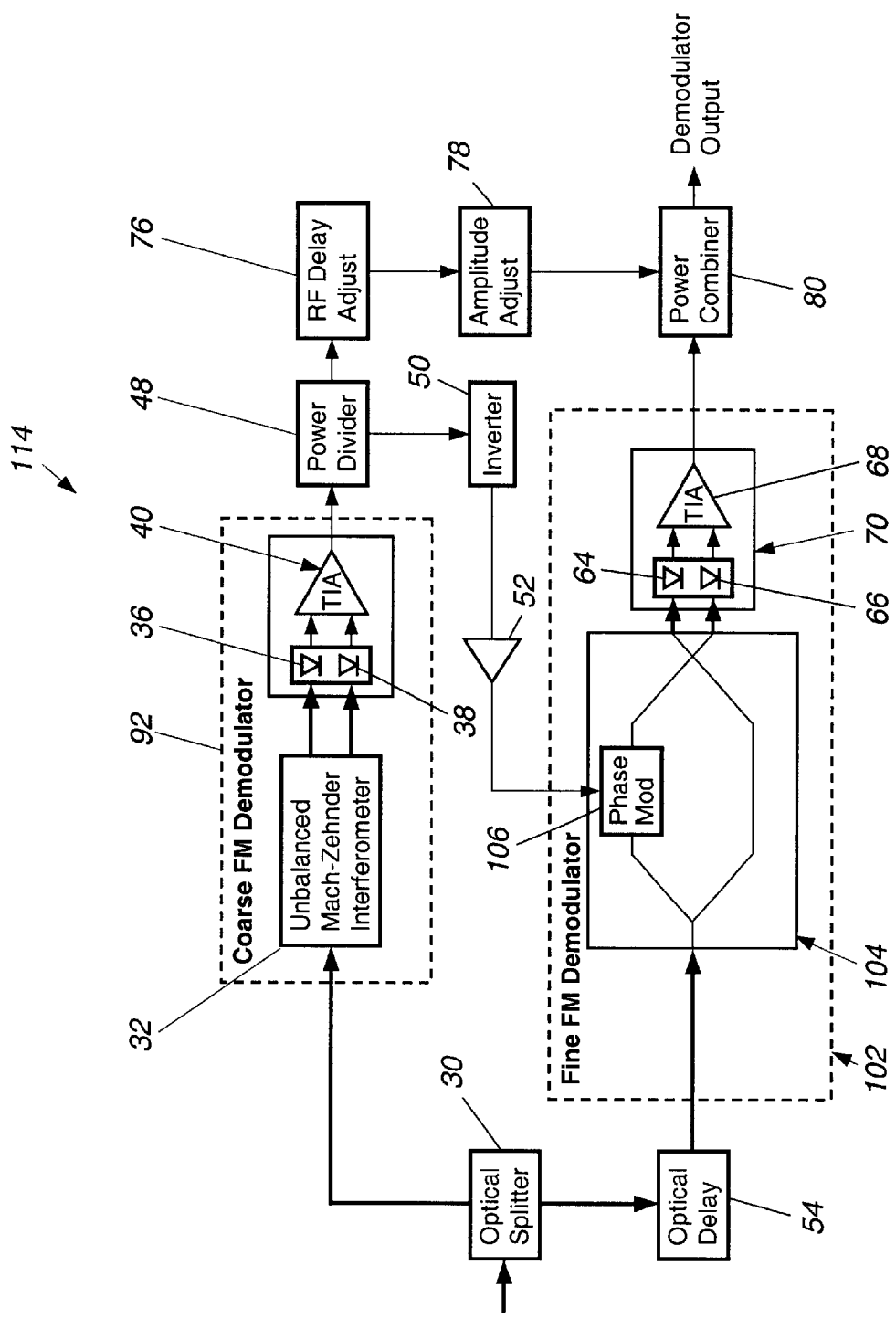
FIG. 8 is a schematic block diagram of a feed-forward optical FM demodulator, including an embedded phase modulator, that can be used in the receiver of the optical links shown in FIG. 1.

FIG. 8 is a schematic block diagram of another feed-forward optical FM demodulator system 114 that employs the phase modulator 106 in the path of the unbalanced MZI 104 in the fine FM demodulator 102. This design is for FM demodulation because the RF integrator 108 has been eliminated.

The use of unbalanced MZIs, photodetectors and differential amplifiers in the various coarse and fine demodulators discussed above is by way of a non-limiting example. Other designs, within the scope of the present invention, may include other types of demodulators that would operate substantially in the same manner as discussed herein.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An optical modulator for an analog optical link, said optical link transmitting an optical carrier signal modulated by an RF signal, said modulator comprising:
   an optical waveguide responsive to the optical carrier signal; and
   a pair of opposing electrodes positioned relative to the waveguide, a first one of the electrodes being responsive to the RF signal to generate an electric field between the electrodes that affects the index of refraction of the optical waveguide, said optical carrier signal propagating through the electric field, said opposing electrodes having a length such that the modulator operates as a frequency modulator for an RF signal having a first frequency and as a phase modulator for an RF signal having a second frequency, the second frequency being higher than the first frequency.

2. The modulator according to claim 1 wherein the opposing electrodes are long enough to have an RF loss versus RF frequency that provides an optimized Vπ for a frequency bandwidth greater than 5 GHz.

3. The modulator according to claim 1 wherein the opposing electrodes have a length so that the modulator has about 18 dB electrical loss for an 18 GHz RF signal and about 6 dB of electrical loss at an RF frequency of 2 GHz.

4. The modulator according to claim 1 wherein the modulator operates as a frequency modulator for an RF signal having a frequency of about 2 GHz.

5. The modulator according to claim 1 wherein the operates as a phase modulator for an RF signal in the range of 5 GHz to 18 GHz.

6. An optical phase modulator for an analog optical link, said optical link transmitting an optical carrier signal modulated by an RF signal, said modulator comprising:
   an optical waveguide responsive to the optical carrier signal; and
   a pair of opposing electrodes positioned relative to the waveguide, a first one of the electrodes being responsive to the RF signal to generate an electric field between the electrodes that affects the index of refraction of the optical waveguide, said optical carrier signal propagating through the electric field, said opposing electrodes having a length such that the modulator operates as a frequency modulator for an RF signal having a first frequency and as a phase modulator for an RF signal having a second frequency, the second frequency being higher than the first frequency.

7. The modulator according to claim 6 wherein the opposing electrodes are long enough to provide an RF loss versus RF frequency that provides an optimized Vπ for a frequency bandwidth over 1 GHz.

8. The modulator according to claim 7 wherein the opposing electrodes are long enough to have an RF loss versus RF frequency that provides an optimized Vπ for a frequency bandwidth greater than 5 GHz.

9. A method of modulating an optical carrier signal by an RF signal for transmitting the carrier signal on an analog optical link, said method comprising the steps of:
   propagating the optical carrier signal down an optical waveguide;
   applying the RF signal to electrodes within the waveguide to generate an electric field across the waveguide that affects the index of refraction of the waveguide; and designing the length of the waveguide and the electrodes having a length such that the modulator operates as a frequency modulator for an RF signal having a first frequency and as a phase modulator for an RF signal having a second frequency, the second frequency being higher than the first frequency.

10. The method according to claim 9 wherein the step of designing the length of electrodes includes causing the transmitted optical carrier signal to have an RF loss versus RF frequency that provides an optimized $V\pi$.

11. The method according to claim 9 wherein the step of designing the length of the electrodes includes designing an RF loss versus RF frequency that provides an optimized $V\pi$ for a frequency bandwidth greater than 5 GHz.

* * * * *